(12) United States Patent  
Wolfe

(10) Patent No.: US 8,428,614 B2
(45) Date of Patent: Apr. 23, 2013

(54) MOBILE PHONE MEDIATED TREASURE HUNT GAME

(76) Inventor: Jason H. Wolfe, Stamford, CT (US)

( * ) Notice: Subject to any disclaimer, the term of this patent is extended or adjusted under 35 U.S.C. 154(b) by 1412 days.

(21) Appl. No.: 11/775,644

(22) Filed: Jul. 10, 2007

(65) Prior Publication Data

US 2008/0009349 A1   Jan. 10, 2008

Related U.S. Application Data

(60) Provisional application No. 60/819,576, filed on Jul. 10, 2006.

(51) Int. Cl.
*H04W 24/00* (2009.01)
*H04M 3/42* (2006.01)

(52) U.S. Cl.
USPC ............ 455/456.1; 455/414.2; 455/456.3; 379/201.05

(58) Field of Classification Search ........ 455/456.1–457
See application file for complete search history.

(56) References Cited

U.S. PATENT DOCUMENTS 6,320,495 B1 * 11/2001 Sporgis ............... 340/323 R
6,756,882 B2 *  6/2004 Benes et al. ......... 340/323 R
6,932,698 B2 *  8/2005 Sprogis ..................... 463/9

OTHER PUBLICATIONS

Andreas Jakl, "The Workflow of C++ Game Development on a Series 60 Platformn Device", May 2004, 43 pages.
http://en.wikipedia.org/wiki/Masquerade, "Masquerade (book)", Jun. 16, 2005, 2 pages.
http://en.wikipedia.org/wiki/Armchair_treasure_hunt, "Armchair Treasure Hunt", Jun. 16, 2005, 1 page.
http://en.wikipedia.org/wiki/Letterboxing, "Letterboxing", Jun. 30, 2005, 2 pages.
http://en.wikipedia.org/wiki/The_Amazing_Race, "The Amazing Race", Jul. 5, 2005, 9 pages.
http://en.wikipedia.org/wiki/A_Treasure%27s Trove, A Treasure's Trove, Jul. 9, 2005, 2 pages.
http://en.wikipedia.org/wiki/Alternate_reality_game, "Alternate Reality Game", Jul. 9, 2005, 4 pages.
http://en.wikipedia.org/wiki/Geocaching, "Geocaching", Jul. 10, 2005, 5 pages.
http://en.wikipedia.org/wiki/Road_rally, "Road Rally", Jul. 9, 2006, 4 pages.

* cited by examiner

*Primary Examiner* — Huy C Ho
(74) *Attorney, Agent, or Firm* — St. Onge Steward Johnston & Reens, LLC

(57) ABSTRACT

A system for providing a mobile phone based treasure hunt game including a system server including puzzle data pertaining to a plurality of geographic sites, at least one mobile phone, a plurality of geographically diverse mobile phone location identifiers, software executing on the system server for receiving location data pertaining to the at least one mobile phone, the location data indicative of a location of the at least one mobile phone relative to at least one of the location identifiers, software executing on the system server for determining at least one of the geographic sites within a predetermined distance of the location, and software executing on the system server for providing at least a portion of the puzzle data pertaining to the at least one geographic site to the at least one mobile phone.

21 Claims, 16 Drawing Sheets

MOBILE PHONE MEDIATED TREASURE HUNT GAME

CROSS-REFERENCE TO RELATED APPLICATIONS

This application claims the benefit of, under 35 §U.S.C. 119(e), U.S. Provisional Application No. 60/819,576, filed on Jul. 10, 2006.

FIELD OF THE INVENTION

The present invention relates generally to a treasure hunt game, and more specifically to a location-based mobile phone application for providing a treasure hunt game consisting of puzzles solved at specific physical locations.

BACKGROUND OF THE INVENTION

High-tech treasure or scavenger hunt games have become popular in recent years. For example, geocaching.com provides an online community for users to post information about objects hidden around the world, including geographic coordinates for the object's location. Users of geocaching.com may record the coordinates of an object or "cache" they wish to search for from the website and use a Global Positioning System ("GPS"), such as a handheld GPS unit, to narrow the search to the specific location and locate the cache. Users may then share stories about their search and the cache via the online community.

In order to participate in geocaching, a user requires a GPS unit. Furthermore, a user must access information about a specific cache via the Internet and subsequently locate the cache based on its coordinates. What is desired is an improved treasure hunt game accessible to users without a GPS unit. What is also desired is a treasure hunt game in which a user can receive real-time clues with instant feedback for their answers and information pertaining to multiple treasures during the user's search.

SUMMARY OF THE INVENTION

Accordingly, it is an object of the present invention to provide a system and method for providing an experience akin to a treasure hunt or adventure that is accessible to the public at large using location-based cell phone technology.

It is a further object of the present invention to provide a system and method for providing an adventure video game overlaid on physical, real-world geography. It is a further object to provide such a system that encourages exercise, learning, exposure to culture and history, education, and socialization (online and face to face).

These and other objectives are achieved by providing a system for providing a mobile phone based treasure hunt game including a system server including puzzle data pertaining to a plurality of geographic sites, at least one mobile phone, a plurality of geographically diverse mobile phone location identifiers, software executing on the system server for receiving location data pertaining to the at least one mobile phone, the location data indicative of a location of the at least one mobile phone relative to at least one of the location identifiers, software executing on the system server for determining at least one of the geographic sites within a predetermined distance of the location, and software executing on the system server for providing at least a portion of the puzzle data pertaining to the at least one geographic site to the at least one mobile phone.

Other objectives are achieved by providing a system for providing a mobile device based treasure hunt game including a system server including puzzle data pertaining to a plurality of geographic sites, at least one mobile device in communication with the system server via the Internet, the mobile device including a user interface for displaying puzzle data and receiving user input, software executing on the at least one mobile device for providing location data to the system server indicative of a location of the mobile device, software executing on the system server for determining at least one of the geographic sites in a vicinity of the location based on the location data, and software executing on the system server for providing at least a portion of the puzzle data pertaining to the at least one geographic site to the mobile device.

Other objectives are achieved by providing a method for providing a mobile phone based treasure hunt game, including the steps of a method for providing a mobile phone based treasure hunt game including the steps of determining a plurality of geographic sites, generating puzzle data concerning the plurality of geographic sites, the puzzle data including at least a location of each of the geographic sites, determining a location of at least one mobile phone, determining at least one of the geographic sites within a predetermined range of the location of the mobile phone, and providing at least a portion of the puzzle data concerning the geographic sites within the predetermined range to the mobile phone.

Other objects of the invention and its particular features and advantages will become more apparent from consideration of the following drawings and accompanying detailed description.

DETAILED DESCRIPTION OF THE INVENTION

Figure 1A:
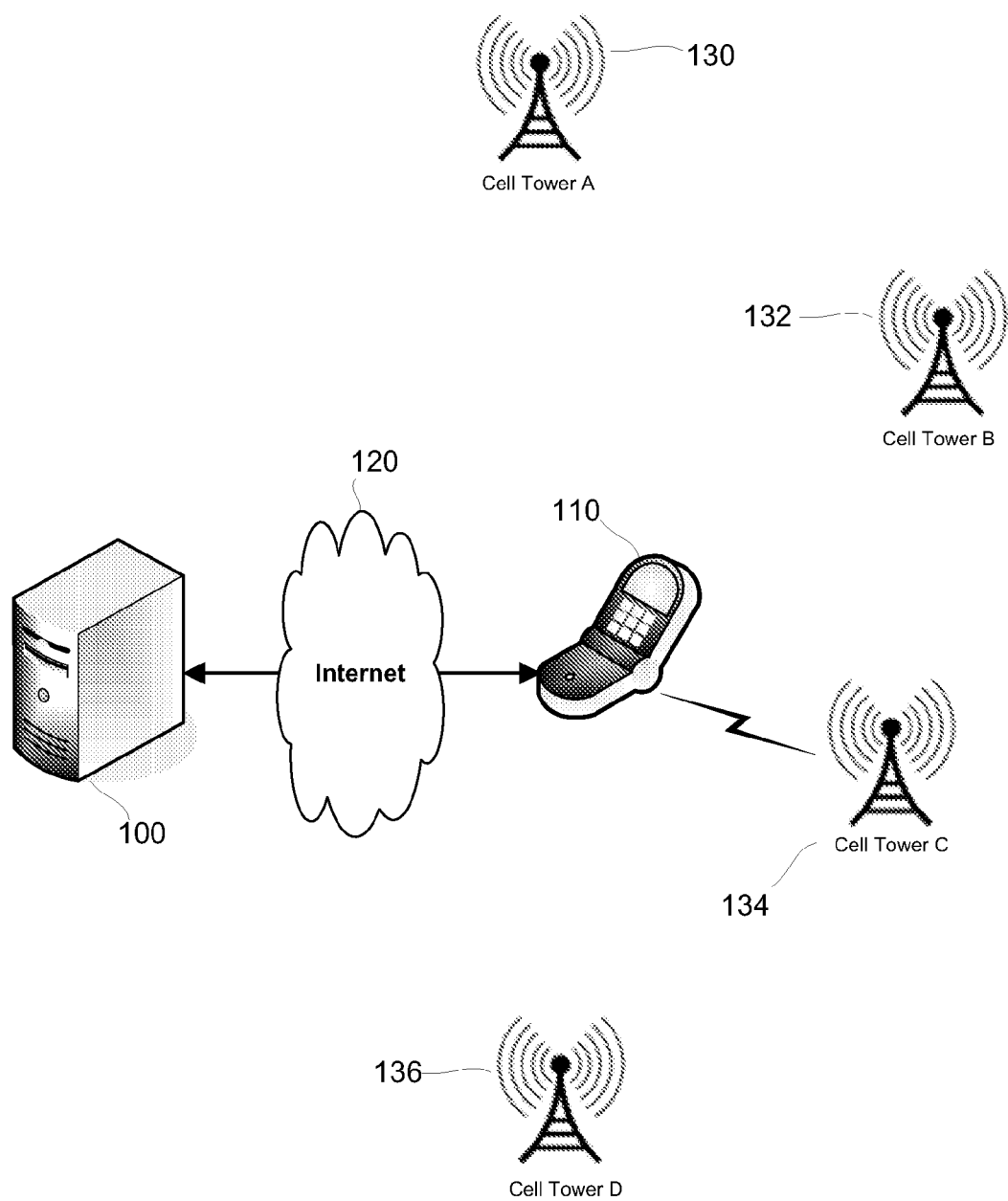
FIG. 1A is a schematic view of a system for providing a mobile phone based treasure hunt game according to the present invention.
Figure 1B:
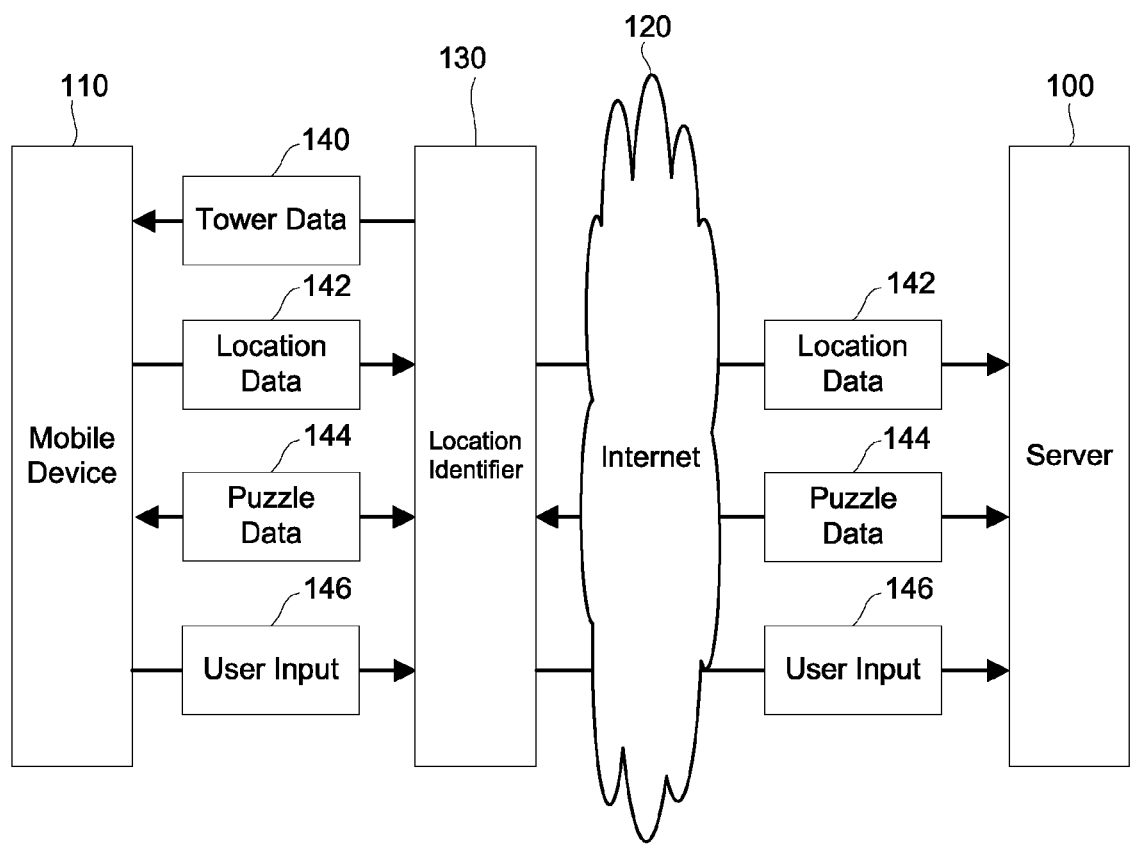
FIG. 1B is another schematic view of a system for providing a mobile phone based treasure hunt game according to the present invention.
Figure 1C:
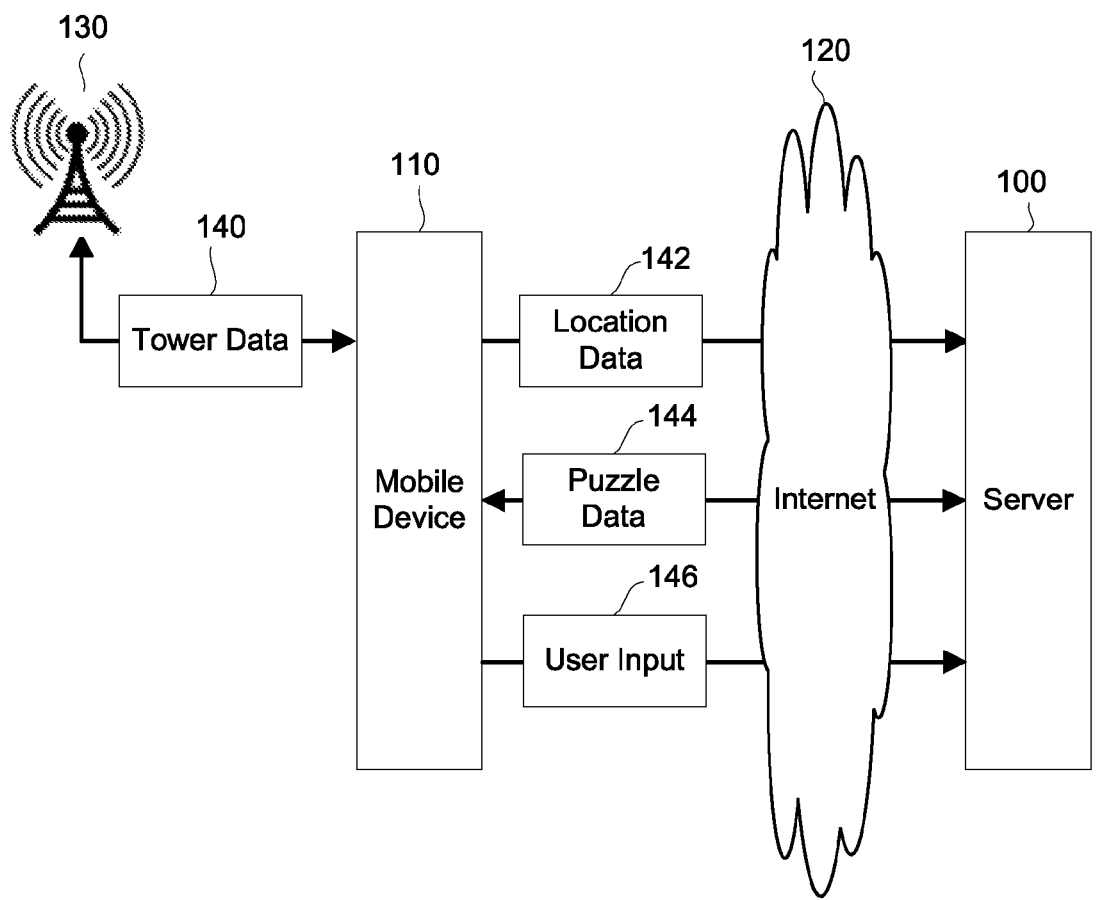
FIG. 1C is another schematic view of a system for providing a mobile phone based treasure hunt game according to the present invention.

FIGS. 1A-1C show a system for providing a mobile phone based interactive treasure hunt game according to an exemplary embodiment of the present invention. As will be understood from the following description, the present invention provides mobile phone users with a series of puzzles or hunts which relate to various real world geographical locations or sites. A user is directed to the sites (e.g., in sequence) by means of various clues or information provided to the user's mobile phone. Once a particular puzzle is solved and/or a site found, new puzzles may be revealed. A score is kept by the system for every puzzle solved by a particular user.

The system includes at least one system server 100 accessible to the Internet 120 or other communication networks. The system server 100 may include any number of databases (not shown). The system further includes any number of mobile phones 110. The mobile phones 110 preferably include cell or mobile phones including a display or graphical user interface and internet accessibility. In some embodiments, the mobile phones 110 are other mobile devices such as personal data assistants ("PDA"), music devices having wireless connectivity (e.g., iPod), or a combination thereof.

The exemplary system further includes a plurality of location identifiers, such as cell towers 130-136. The cell towers may be located anywhere in the world. For example, the system may employ each cell phone tower in the United States, North America, and/or any other countries or continents in the world. Using the cell towers (e.g., 130-136) or other location identifiers, the system may determine the location of any one of the plurality of mobiles phones 110. The system determines which particular cell tower a mobile phone 110 is currently in communication with along with the mobile phone's orientation to the cell tower (e.g., 134). For example, a mobile phone 110 (e.g., or locator module thereof) may receive tower data 140 from one or more cell towers. The tower data 140 may include, e.g., information indicative of the particular tower's identity and/or location. In some embodiments, a distance and/or direction from the tower(s) may also be determined using triangulation techniques or other known location determining methods.

The mobile phone 110 (and/or locator module thereof) provides location data 142 to the server based on the tower data 140. The location data 142 may include a particular location or, in some embodiments, a cell area. The system server 100 may then provide puzzle information (e.g., 144) to the mobile phone 110 based on the mobile phone's location and/or orientation. For example, the system server 100 may provide a hint or clue to assist a user in finding an object or treasure in or around the user's location (e.g., a monument), or may provide a puzzle challenge or question to the user to verify that a site, object or treasure has been found. The system may receive user input 146 via the mobile device 110, such as a response to a question, a request for a hint or clue, and/or verification that a site has been found. Each puzzle site may be pre-mapped by the system in advance, and therefore the system may detect when a user is in the general vicinity of a particular site, treasure or object. Therefore, the puzzle challenge may be activated automatically when the user arrives in a designated area.

The mobile phone 110 may access the internet 120 and/or server 100 via any number of means. For example, as shown in FIG. 1B, the mobile phone 110 may obtain access via the plurality of cell towers 130-136 (e.g., cellular network and/or wireless wide area network). The mobile phone 110 may also access the internet 120 independent of the cellular network as shown in FIG. 1C. For example, in some embodiments, the mobile phone 110 includes a Wi-Fi transceiver (and/or transmitter and receiver) for accessing the internet 120 via a Wi-Fi connection. A Wi-Fi connection may be established in the vicinity of a Wi-Fi hotspot, in a Wi-Fi enabled city or area, via long range Wi-Fi, etc.

Figure 2:
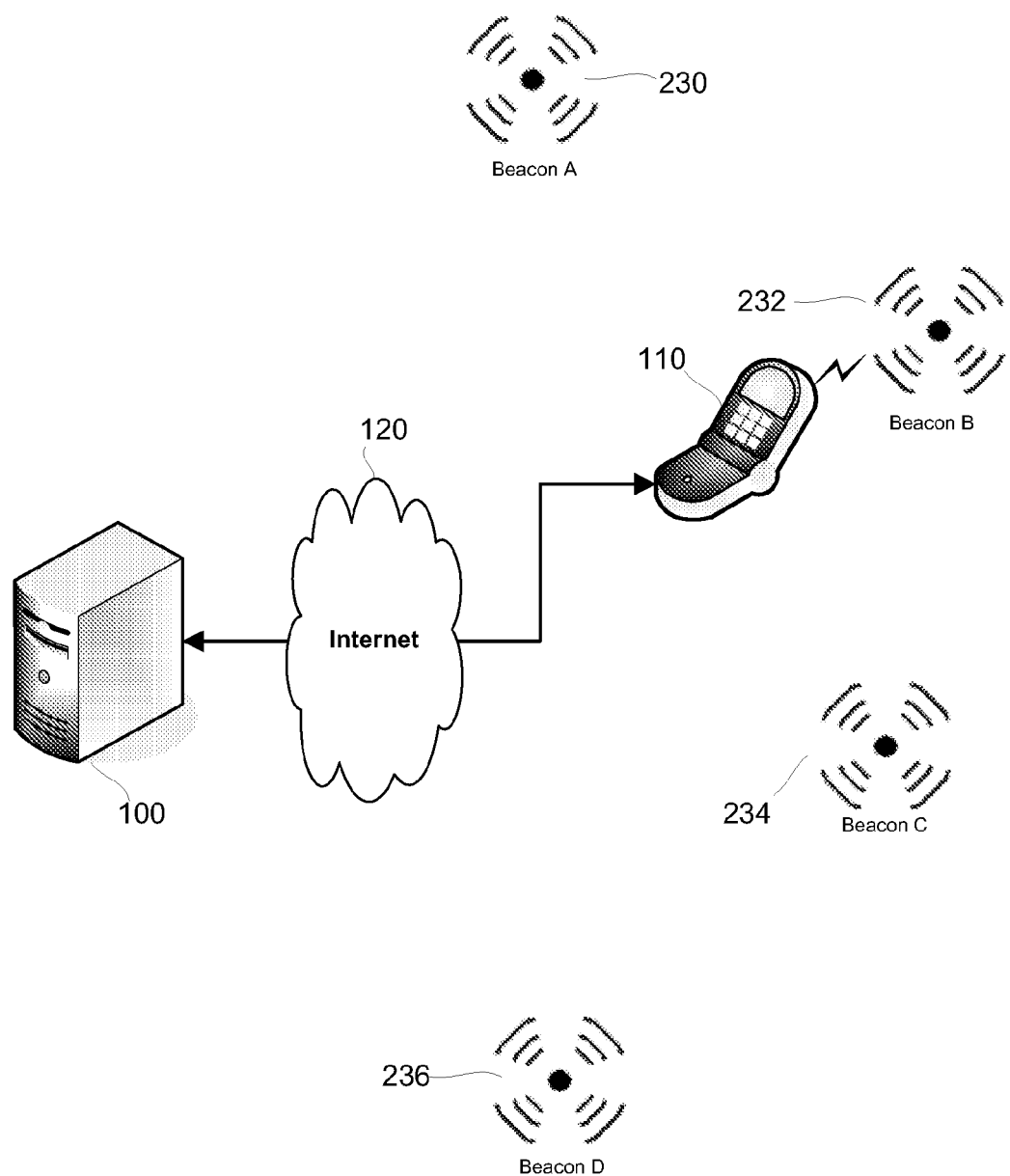
FIG. 2 is another schematic view of the system for providing a mobile phone based treasure hunt game according to the present invention.

FIG. 2 shows another view of the system according to the present invention. The system includes the system server 100 and Internet 120. The system further includes the mobile phones 110. In the exemplary embodiment, the location identifiers also include a plurality of beacons 230-236. The beacons 230-236 may be, for example, Bluetooth® enabled beacons or any other short range wireless beacons. The beacons may exchange information with Bluetooth® enabled mobile phones of the present invention. The mobile phone 110, beacon or both may then provide location data 142 to the system server 100. For example, beacon 232 may send and receive tower or beacon data 140 via a Bluetooth® connection with the mobile phone 110. The mobile phone 110 and/or the beacon 232 may then provide location data 142 to the system server 100 indicative of the mobile phone 110 being in the proximity of the beacon 232. Beacons 230-236 can also be used to identify other Bluetooth® devices that are close by, such as other users, or wherever a Bluetooth® device is placed and/or hidden. Since the hidden beacons must be placed and maintained, this method is best suited for controlled environments, such as amusement parks.

The system may also employ a combination of cell towers (e.g., 130-136) and beacons (e.g., 230-236). In some embodiments, one or more of the beacons and/or cell towers of the present invention also includes an access point (e.g. Wi-Fi) for internet connectivity. The system of the present invention may further use any other means (or combination of means) for determining the location of mobile phones. The system is designed to be agnostic toward the various positioning systems which may be employed. For example, the system may use GPS or Enhanced Observed Time Difference ("EOTD"). While EOTD is presently only available to municipal and emergency services, such technology may be employed in the future as permitted.

Regardless of what positioning methods are used, game play is coordinated by the system server 100 and database (e.g., Internet hosted database). Each mobile phone 110 includes software for communicating with the system server 110 (e.g., via TCP/IP network). For example, software executing on the mobile phone 110 may determine location data 142 (e.g., location software), receive puzzle data 144, and/or provide a user interface on the mobile phone 110. The software may also receive and transfer user input 146. In some embodiments, the software is stored remote to the mobile phone 110 (e.g., on the server 100) and accessible via the internet.

The server 100 keeps track of and stores what challenges are available to be solved at what sites, who has solved what, and how the competition is scored. Each player's progress and score is tracked every step of the way, and the results are stored in one or more databases of the server 100. Cheating is hindered by the fact that the server 100 knows which cell the player is in when the application is active.

Users accrue points as they complete puzzles or hunts which may be tracked, stored and displayed via the internet. For example, this information may be available via a community web site hosted on the server 100. The web site may also allow players to find new hunts, to create new hunts for other players, to view their progress and standings (e.g., scores) in relation to other players, and to socialize with other players and spectators. The number of points accrued per puzzle may vary depending on the speed at which the puzzle is solved and whether or not the user required a hint. When the user solves the series of puzzles, he/she may also earn an appellation or a prize for having completed a hunt.

Figure 3:
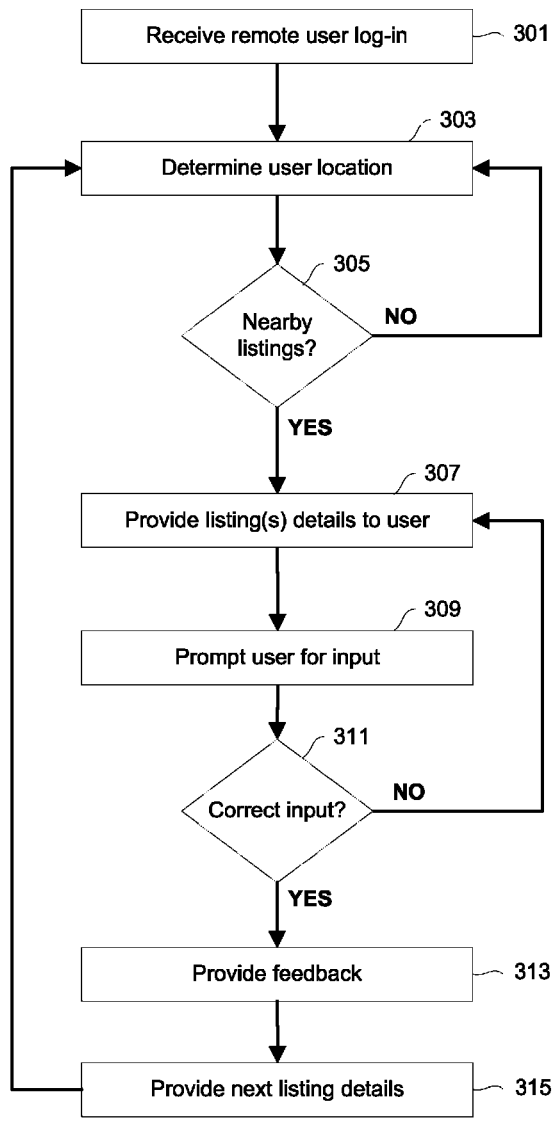
FIG. 3 illustrates a method for providing a mobile phone based treasure hunt game employable by the system shown in FIGS. 1A-2.
Figure 4A:
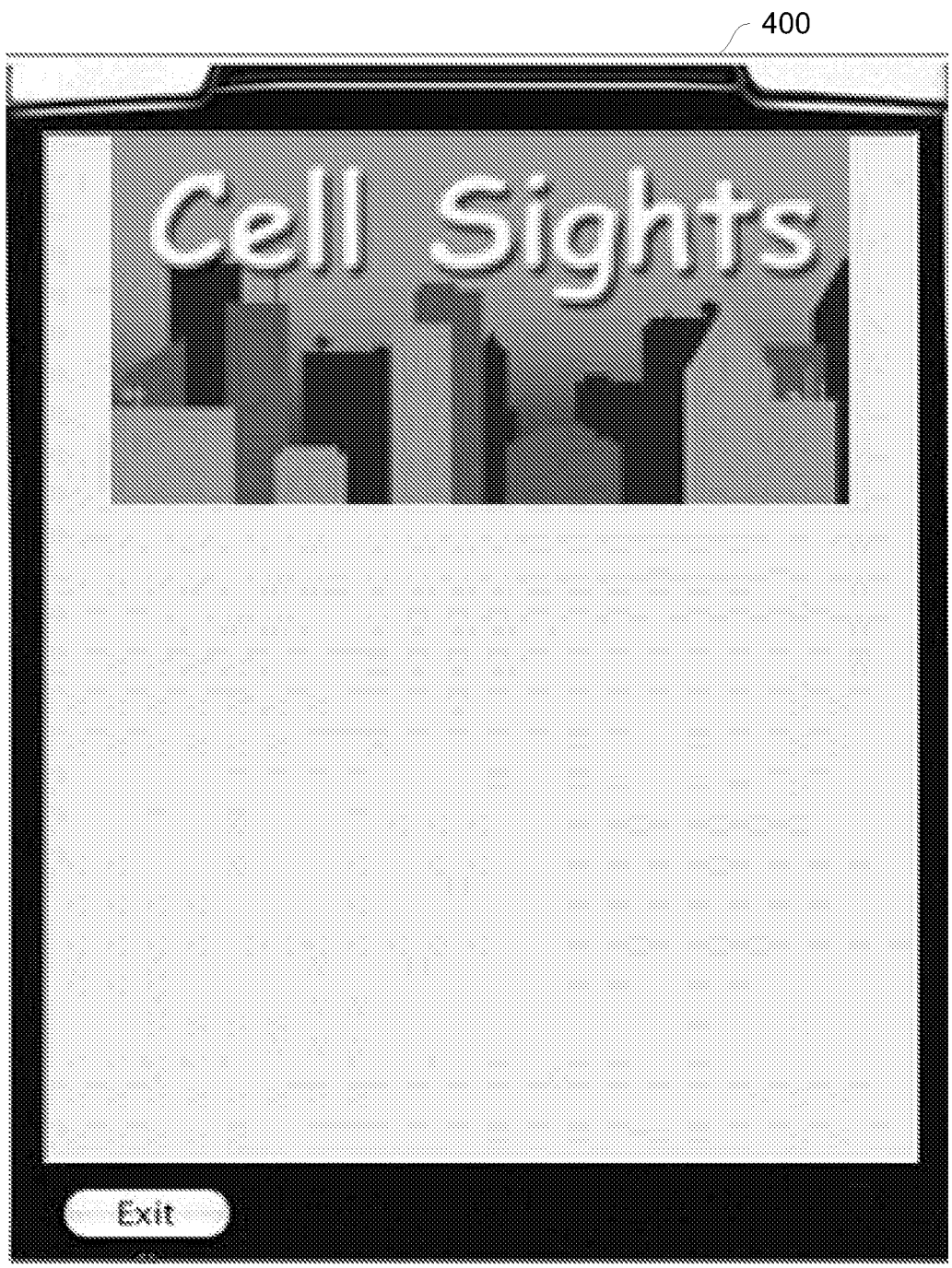
FIGS. 4A-4K illustrate screenshots of an exemplary mobile phone display provided by the system according to the present invention.
Figure 4B:
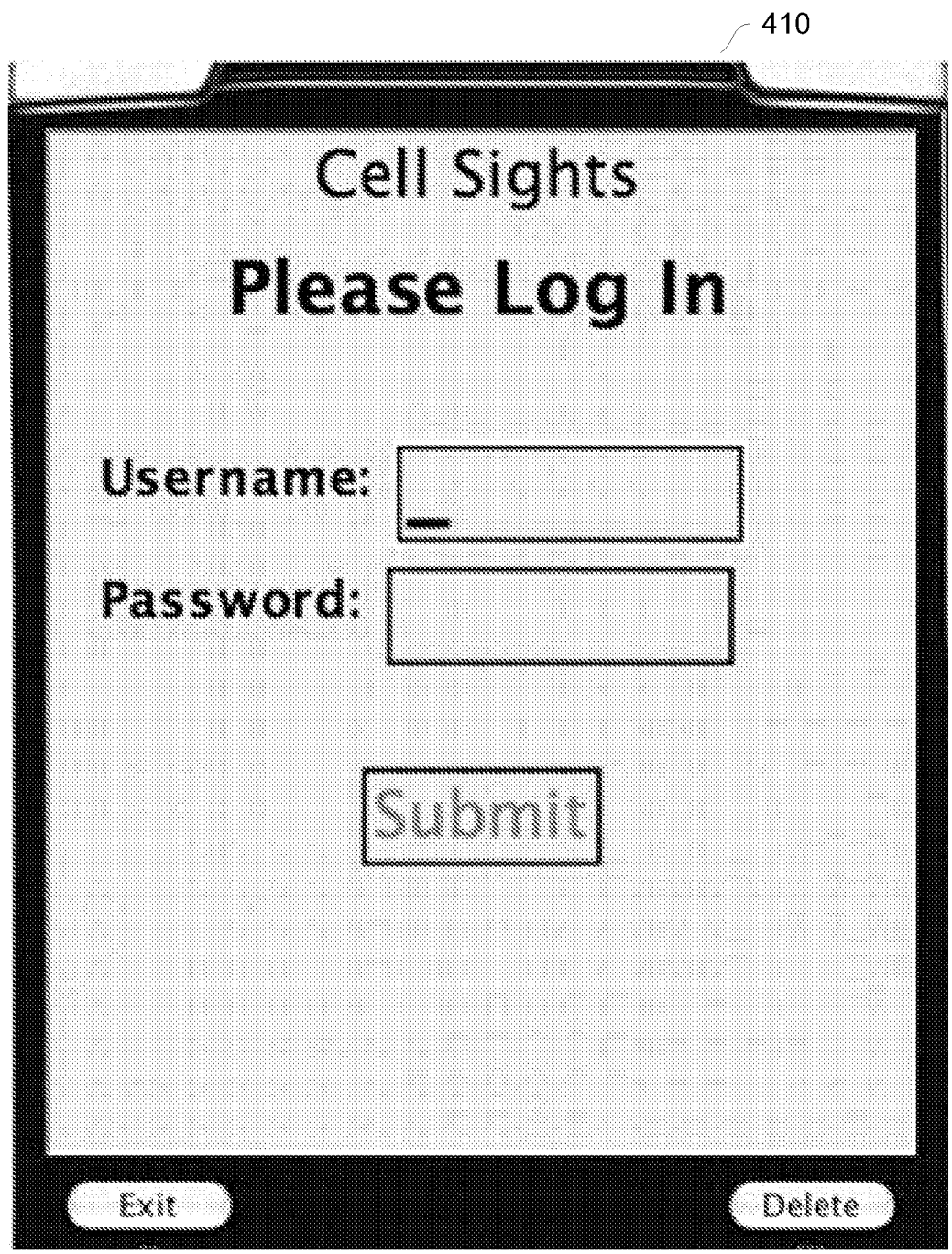
Figure 4C:
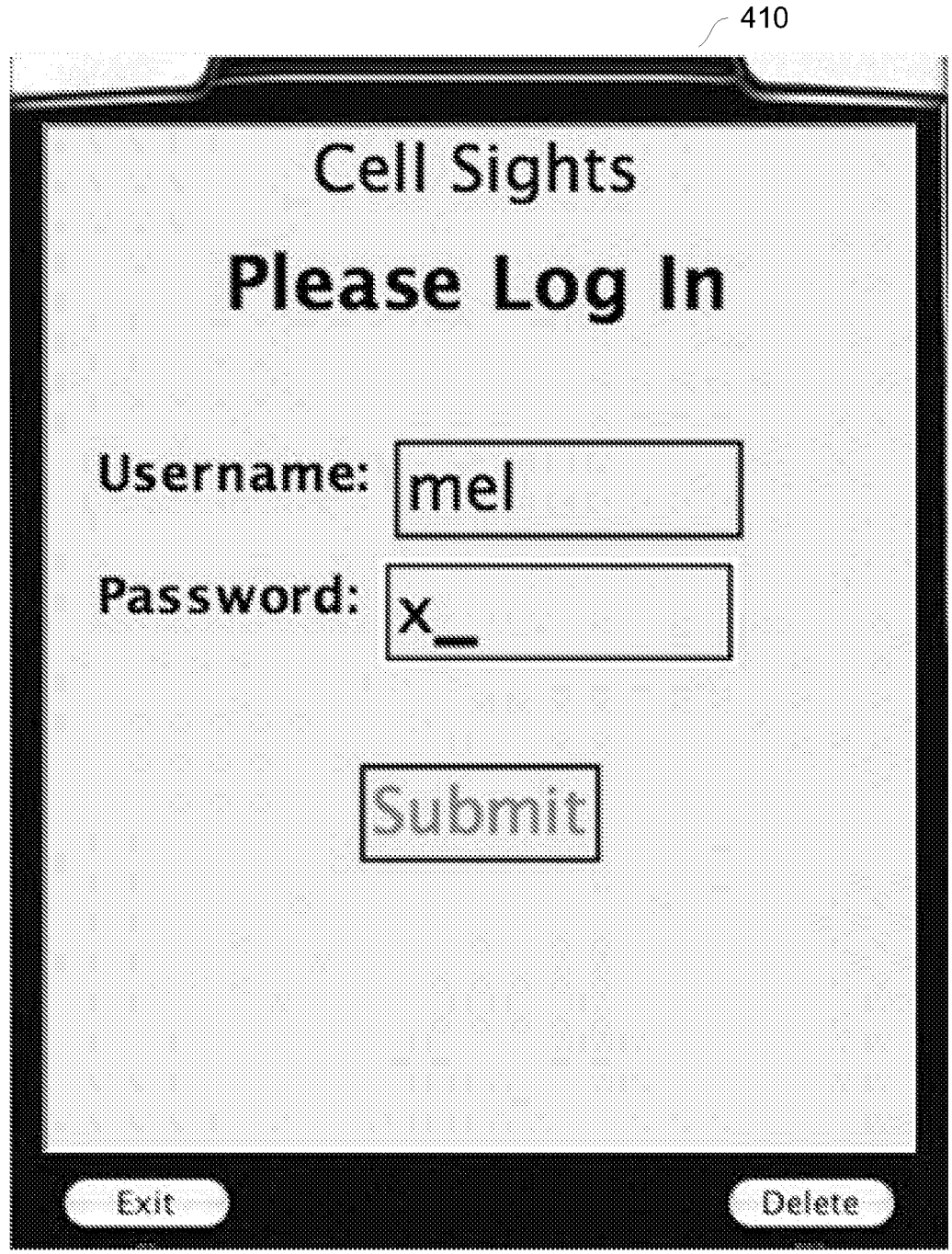

FIG. 3 shows a one exemplary method for providing a mobile phone based treasure hunt game employable by the system. The method includes a step of receiving remote user log-in (step 301). For example, the system server may receive a user's log-in via a mobile phone 110 (see, e.g., FIGS. 4B-4C). The log-in may be a log-in previously created by the user via a website of the system, or a newly created log-in (e.g., via the mobile phone). The log-in is authenticated and the identity of the user determined. Next, the system may determine the user's location (step 303). The user's location may be determined by his/her mobile phone's proximity to a cell tower and/or a beacon or by any other location determining means.

The system may then determine if there are any listings in the user's location (step 305). For example, the system determines whether a site, object or item of the puzzle game is in the user's physical proximity. The system further determines whether any other points of interest, warnings, or observations are applicable to the user's location. In some embodiments, the system can also determine if players are near each other. The system can then alert the user of the nearby player (e.g., and his/her location). This feature may be used not only to promote socializing among the community, but also to create adversarial and/or cooperative elements within the game. For example, nearby users may cooperate to solve a given puzzle and find the site, or compete against one another to be first to find the site.

The present invention does not require carefully set props at the various sites as the users interact with existing real world monuments, historical sites, objects, businesses, and curiosities. However, in some embodiments, stickers, posters, or other props may be used. Furthermore, the present invention also does not require actors or administrators "in theater", as the game is mediated entirely by cell phone—including all puzzles, challenges, score-keeping, and direction. Though in some embodiments, the game uses actors/performance artists to advance the game and to add interest.

Figure 4D:
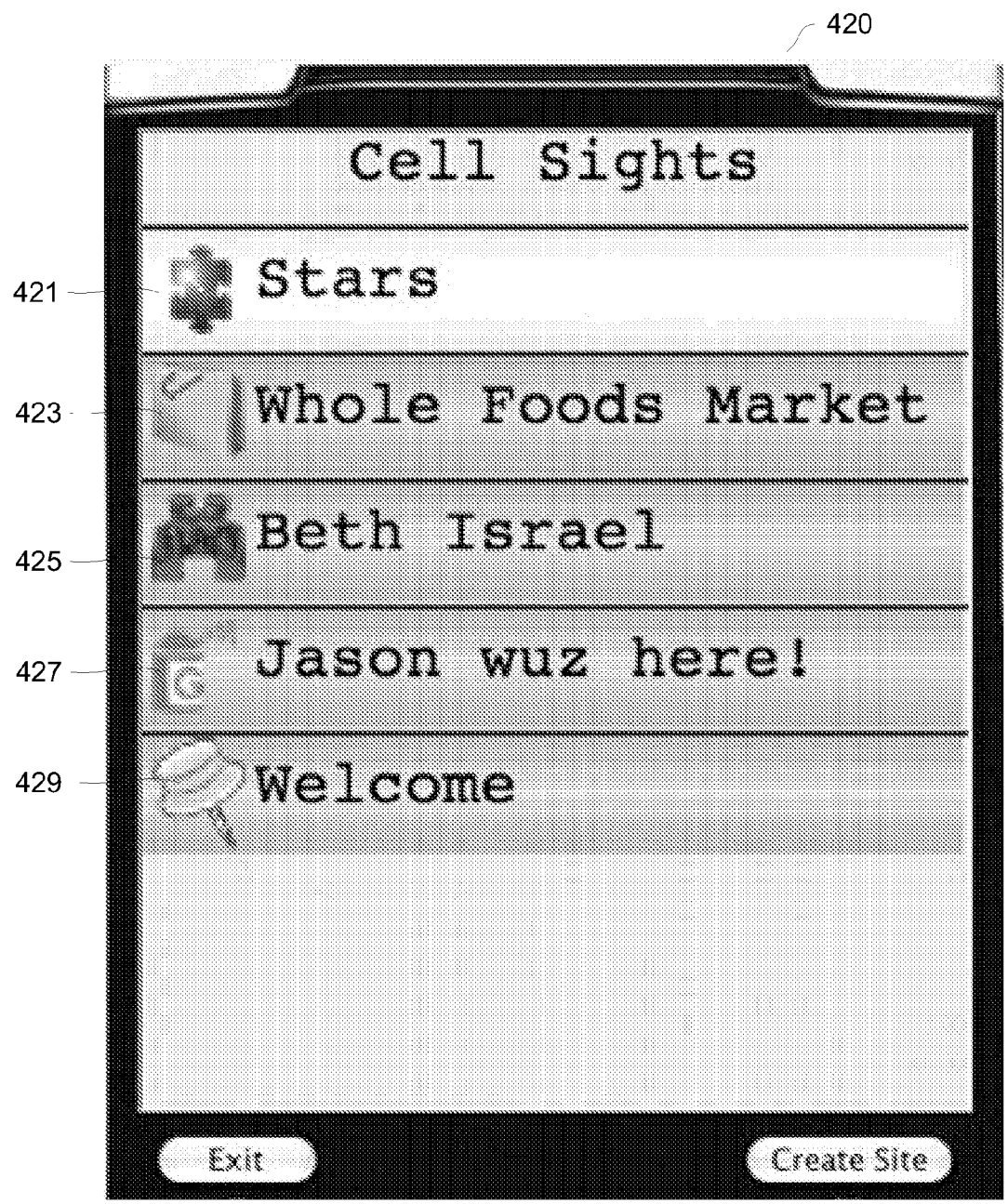

Listings information is then provided to the user via the user's mobile phone (step 307). For example, the system may provide listing information to the user via a user interface of the mobile phone 110, either visually or audibly (see, e.g., FIG. 4D). FIG. 4D shows an exemplary user interface 420 displayed on a mobile phone in or around Union Square in New York City. In the exemplary embodiment, there are five different items in the list pertaining to this location. Various symbols may be displayed on the user interface 420. For example, a puzzle piece 421 may be displayed that "pulses" with light until the user has solved the current puzzle. A shopping bag 423 indicates a store, binoculars 425 indicate things to see in the user's area, a spray can 427 indicates "virtual" graffiti, and a thumb tack 429 indicates bulletin board type information. As shown, the puzzle row is highlighted to indicate that it is the user's active selection. Pressing the up/down arrows allows the user to scroll from one listing to the next. If one presses the center "enter" button, then that listing is selected.

Figure 4E:
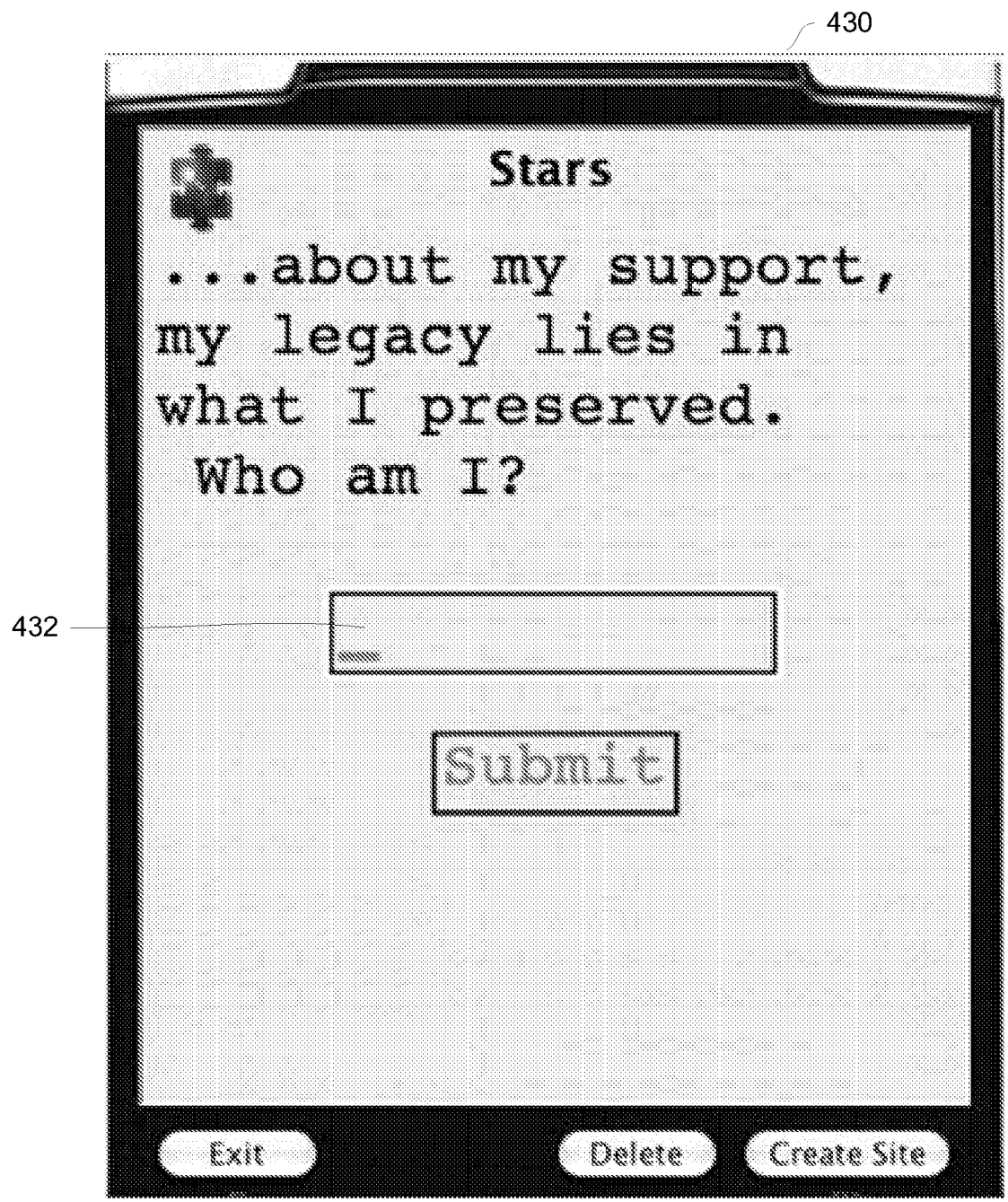
Figure 4F:
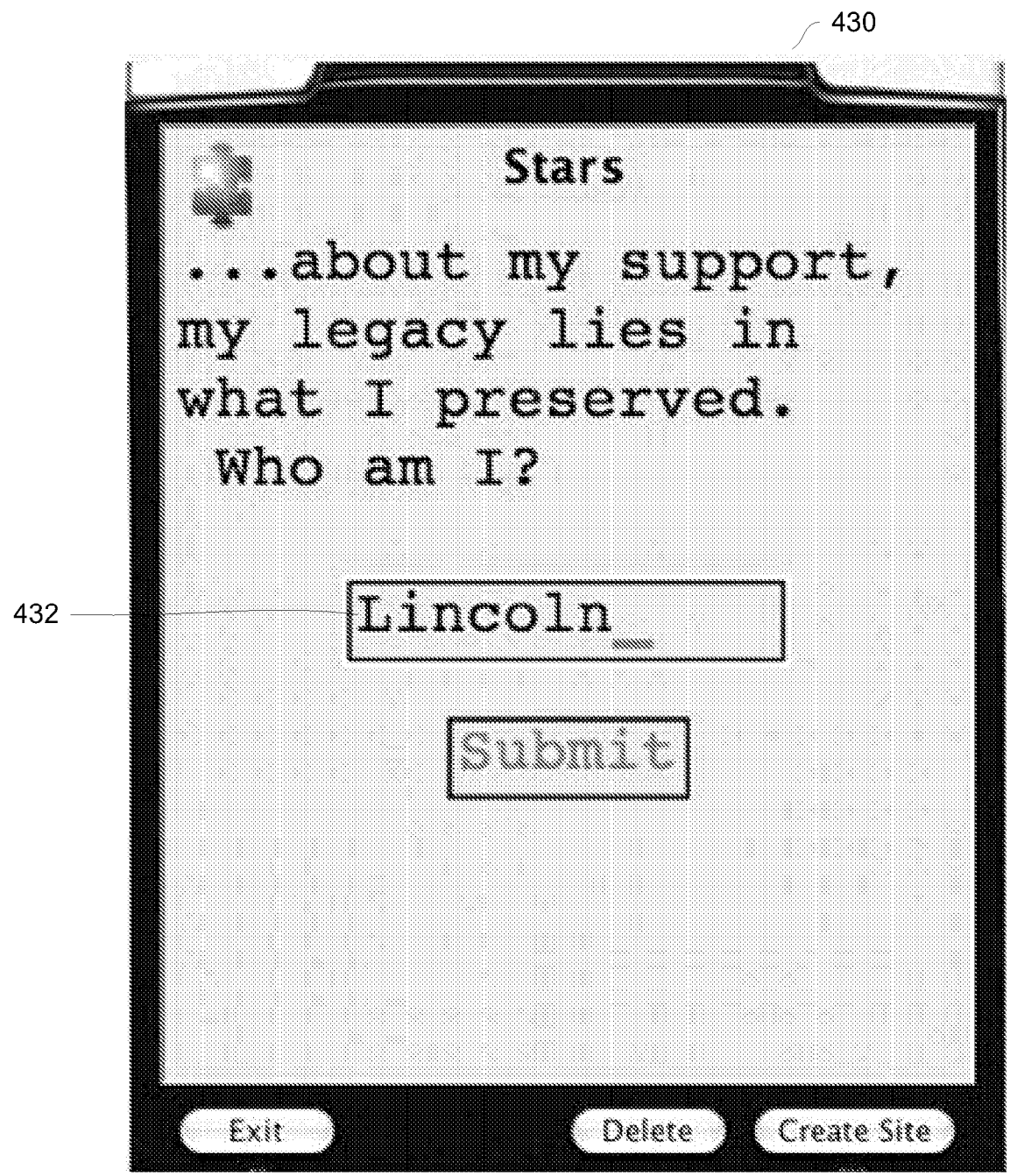
Figure 4G:
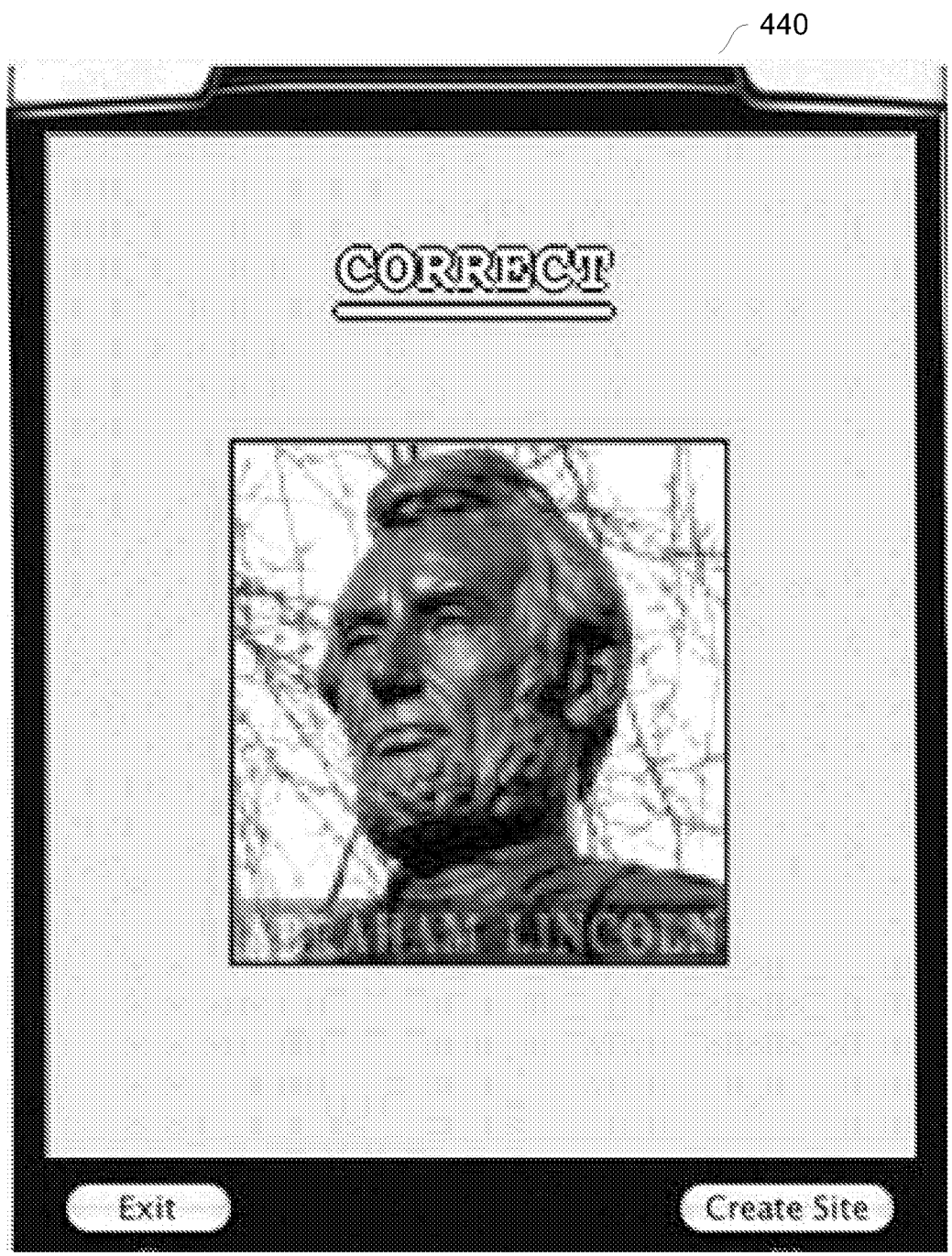

Shown in FIG. 3, the system may then prompt the user (step 309). For example, the system may ask the user a question about the puzzle location or a puzzle challenge. See, e.g., FIG. 4E. The challenge may be a problem to be solved such as a riddle, a question about your surroundings, a math problem, a cypher, a question that involves lining up landmarks or referring to a map, etc. The user may then provide an answer (e.g., user input 146) in a response portion 432 of the user interface 430. See, e.g., FIG. 4F. If the answer is correct, the user may receive text feedback (step 311-313). See, e.g., FIG. 4G. The user may also receive multimedia feedback which relates to the puzzle (i.e. sound, images, video, etc).

Figure 4H:
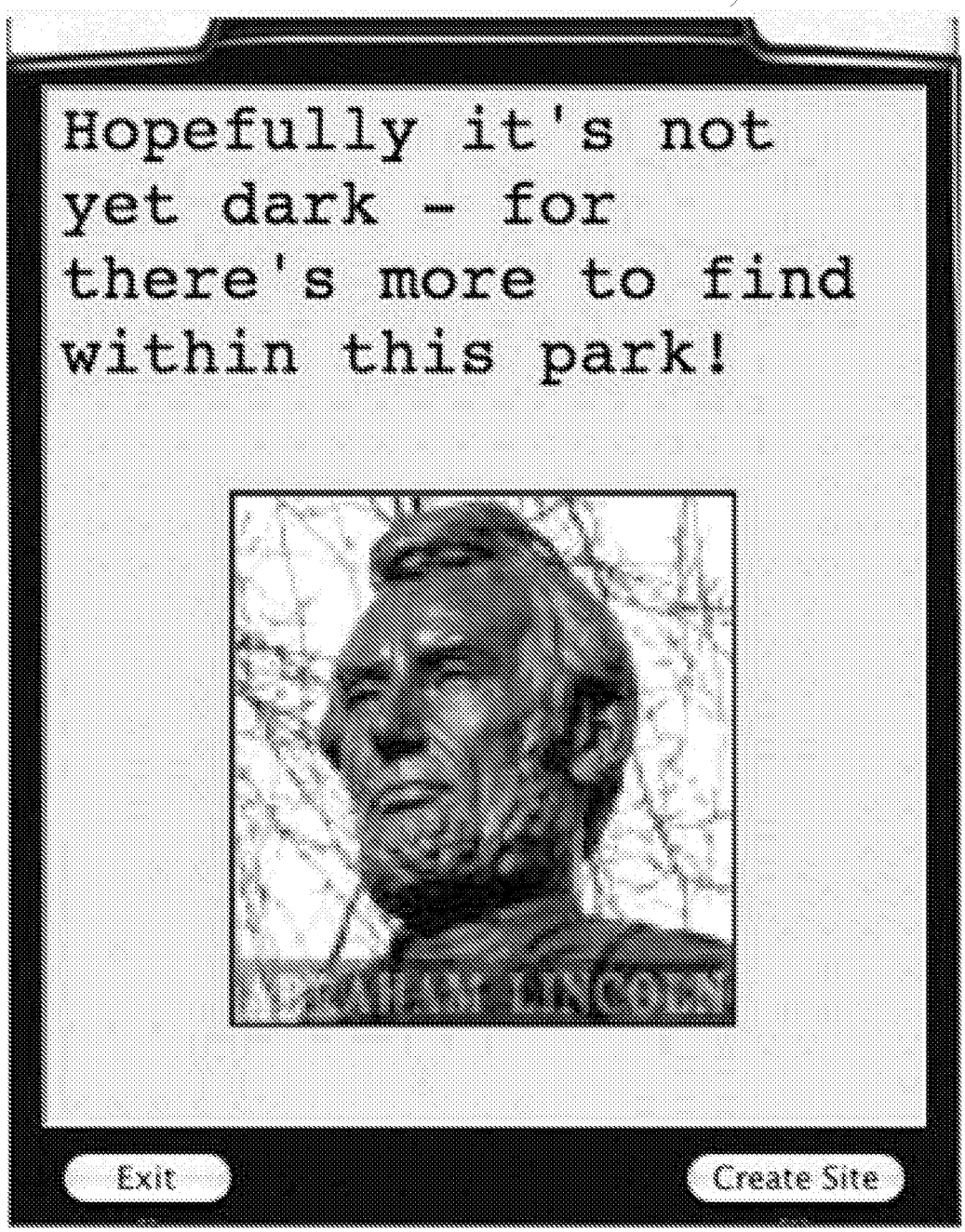

Listing information or clues to a next puzzle location are then provided (step 315). See, e.g., FIG. 4H-4I. For example, once the user has completed a challenge, the system may direct him or her to the next one in the hunt. In some cases, the next challenge is in the same or nearby physical location while, other times, the user may be directed to a different location (e.g., an address, a specific landmark, down a particular street, etc). Furthermore, a user may be directed to a place of business, perhaps to get a clue from a poster on the wall, or to exchange a pass-phrase with a bartender for a discount. As the user changes locations, the system automatically updates the listing information being provided.

In one exemplary embodiment, as a user walks around a location (e.g., a park) and find the area where the next clue is located, the listing screen will remain, and the mobile phone will make a small tone to notify the user of changes on the display. See, e.g., FIG. 4I. In this example, the user is still in the same park and therefore some of the other listings (e.g., Whole Foods, Beth Israel, and "Jason wuz here!") remain on the screen. A new puzzle to solve may be indicated with a "flashing" or "pulsing" light on the puzzle symbol, whereas solved puzzles may be displayed as plain puzzle piece images.

After the user goes around to a few different locations (e.g., parks) to solve a series of puzzles, he or she completes a "leg" of the game. Completing a "leg" of the game amounts to a certain number of points, potentially certain prizes, etc. Points may be awarded to the first person to solve a particular challenge, the first person to complete an entire leg, the first five people to solve a challenge, etc. In some embodiments, the system delivers a narrative story to the user via each leg of the game and/or hunt.

Users may also create their own puzzles for other users to solve. In addition to pre-made "hunts" the present invention thus provides tools to the users which allow them to create their own "hunts" that other users can play. As such, users have the opportunity to stump each other, to rate each other, to share special places which have meaning to them, etc. Users will be doled out points which they can assign to the creators of the best hunts and individual puzzles. This feature further provides a way to harness the resources of the user community to create more and more content for our players and keep the product fresh and interesting. Users may also add non-game-related information about particular locations, such as "virtual" graffiti, stores, interesting landmarks, and bulletin board postings. This may enhance the overall experience by introducing the player to a new location. In essence, the system may also be used as a virtual tour guide for people exploring a new area.

Figure 4I:
Figure 4J:
Figure 4K:
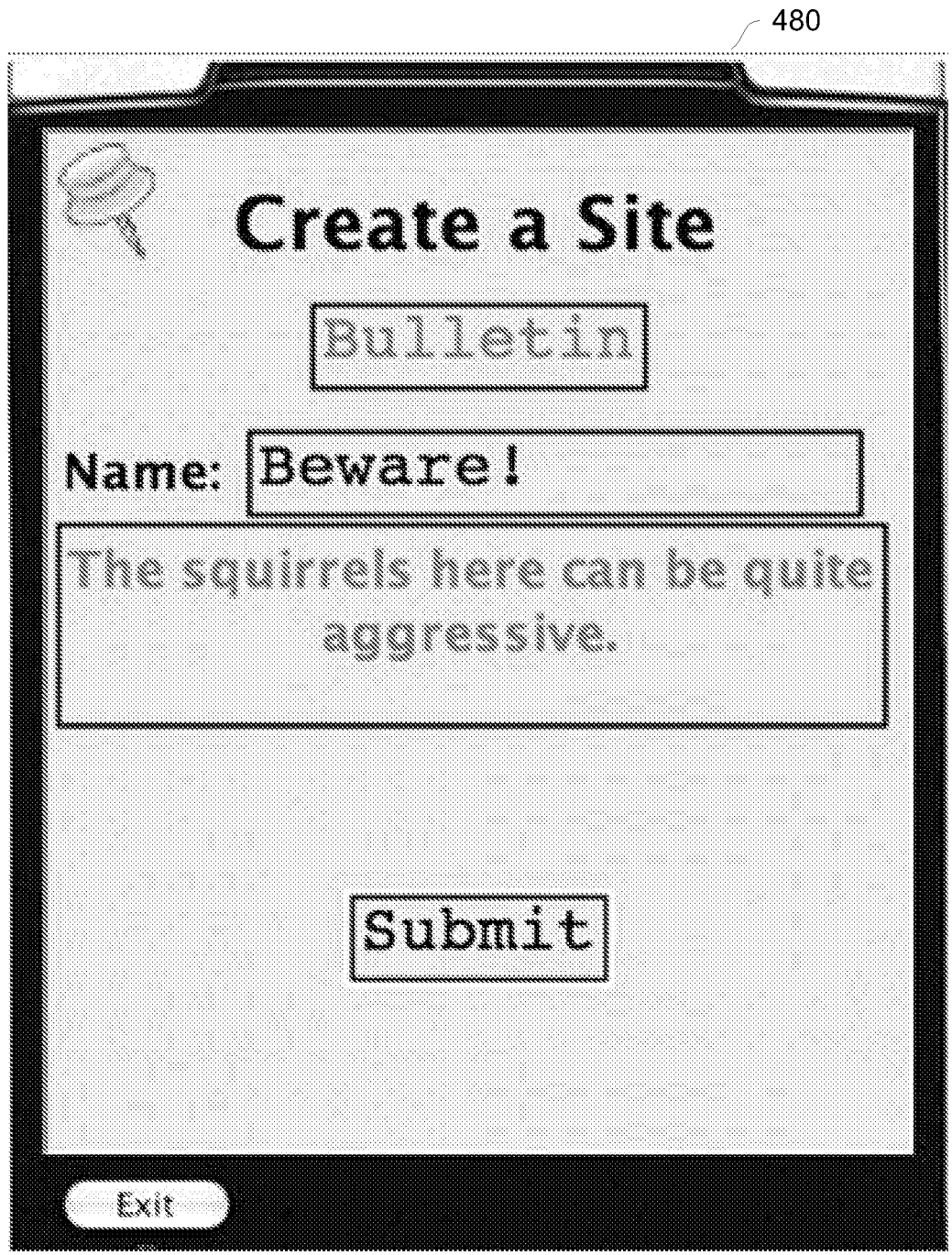

FIGS. 4I-4K illustrate exemplary user interfaces of the system for creating a new puzzle or site and/or providing listing information about a new or existing site. As shown in FIG. 4I, a user may select a "Create Site" icon 462 on the user interface 460 and enter desired information. For example, a user may provide information pertaining to graffiti messages, places to shop, their own puzzles, sights to see, etc. Players can also leave virtual messages for each other "hanging in space", point out real world sights of interest, post warnings of criminal activity, etc. For example, as shown in FIG. 4K, a user decided to create a bulletin board message to warn people of the hungry squirrels.

The geographic location of a new site or message may be stored based on the user's present location. Alternatively, the user may enter a location or select a location from a map. Once submitted, the new site or message will show up on the listing for that area of Union Square. The ability to create sites and puzzles give the users a sense of community and gives players a feeling of "ownership" of the game. This feature also allows user to interact with each other in a meaningful fashion, adds replayability, and allows the system to harness the community itself to add more and more content without significant investment.

As described in the forgoing detailed description, the system and method according to the present invention provides a unique, interactive and continuously evolving treasure hunt game and user community. The system according to the present invention includes a mobile phone based and overlaid on physical, real-world geography. In addition to providing entertainment, the present invention encourages exercise, learning, exposure to culture and history, education, and socialization. The present invention is also particularly useful for promoting travel and tourism purposes by providing a unique means to learn about new locations and generative interest in various locations (e.g., cities, parks, historical sites, etc) around the world.

Although the invention has been described with reference to a particular arrangement of parts, features and the like, these are not intended to exhaust all possible arrangements or features, and indeed many modifications and variations will be ascertainable to those of skill in the art.

What is claimed is:

1. A system for providing a mobile phone based treasure hunt game, comprising:
    a system server including puzzle data pertaining to a plurality of geographic sites;
    at least one mobile phone;
    a plurality of geographically diverse mobile phone location identifiers, wherein the location identifiers include at least one cell tower;
    software executing on said system server for receiving location data pertaining to said at least one mobile phone, the location data indicative of a location of said at least one mobile phone relative to at least one of the location identifiers;
    software executing on said system server for determining at least one of the geographic sites within a predetermined distance of the location;
    software executing on said system server for providing at least a portion of the puzzle data pertaining to the at least one geographic site to said at least one mobile phone;
    software executing on said system server for creating puzzle data pertaining to a new geographic site at the location of said at least one mobile phone in response to a request to create a new site received from said at least one mobile phone; and
    software executing on said system server for creating message data pertaining to at least one of the plurality of geographic sites in response to a request to create the message data received from said at least one mobile phone, wherein said message data is accessible via one or more second mobile phones located within a predetermined range of the at least one of the plurality of geographic sites.

2. The system according to claim 1, wherein said at least one mobile phone includes a user interface for displaying the puzzle data and receiving user input.

3. The system according to claim 2,
    wherein the puzzle data includes a question to the user,
    wherein the user interface receives user input indicative of a response to the question.

4. The system according to claim 1, wherein said at least one mobile phone includes software for receiving tower data from at least one of said location identifiers and generating the location data based on the tower data.

5. The system according to claim 1, further comprising:
    software executing on said system server for determining a score for a user of the mobile phone, the score based at least in part on a number of geographic sites located by the user.

6. The system according to claim 1, wherein said at least one mobile phone includes a Wi-Fi transceiver for sending the location data and receiving the puzzle data.

7. The system according to claim 1, wherein said software for providing at least a portion of the puzzle data to said mobile device further provides location data indicative of a location of a second mobile phone.

8. The system according to claim 1, wherein the plurality of geographic sites includes at least one monument.

9. The system according to claim 1, wherein the message data includes text which is displayed via a user interface of the one or more second mobile phones.

10. A system for providing a mobile phone based treasure hunt game, comprising:
    a system server including puzzle data pertaining to a plurality of geographic sites, wherein said system server includes two or more groups of the puzzle data, each group corresponding to a narrated guided tour;
    at least one mobile phone;
    a plurality of geographically diverse mobile phone location identifiers;
    software executing on said system server for receiving location data pertaining to said at least one mobile phone, the location data indicative of a location of said at least one mobile phone relative to at least one of the location identifiers;
    software executing on said system server for determining at least one of the geographic sites within a predetermined distance of the location; and
    software executing on said system server for providing puzzle data pertaining to the at least one geographic site to said at least one mobile phone, the provided puzzle data including a narrated portion of one of the narrated guided tours and one or more hints concerning the location of a next geographic site on said one of the narrated guided tours.

11. A system for providing a mobile device based treasure hunt game, comprising:
    a system server including puzzle data pertaining to a plurality of geographic sites;
    at least one mobile device in communication with said system server via the Internet, said mobile device including a user interface for displaying puzzle data and receiving user input;
    software executing on said at least one mobile device for providing location data to said system server indicative of a location of said mobile device, wherein the location data is determined using at least one cell tower;
    software executing on the system server for determining at least one of the geographic sites in a vicinity of the location based on the location data;
    software executing on the system server for providing at least a portion of the puzzle data pertaining to the at least one geographic site to said mobile device;
    software executing on said system server for creating puzzle data pertaining to a new geographic site at the location of said at least one mobile device in response to a request to create a new site received from said at least one mobile device; and
    software executing on said system server for creating message data pertaining to at least one of the plurality of geographic sites in response to a request to create the message data received from said at least one mobile device, wherein said message data is accessible via one or more second mobile devices located within a predetermined range of the at least one of the plurality of geographic sites.

12. The system according to claim 11, further comprising:
software executing on said system server for determining a score for a user of said mobile device, the score based at least in part on a number of geographic sites visited by the user.

13. The system according to claim 11, wherein said mobile device is at least one of a mobile phone, a personal data assistant and a portable music device.

14. The system according to claim 11,
wherein the puzzle data includes a question to the user,
wherein the system further comprises software executing on said system server for receiving a puzzle response from said mobile device.

15. The system according to claim 10, wherein said software for providing the puzzle data to said mobile device further provides location data indicative of a location of one or more second mobile phones corresponding to other users on the same guided tour.

16. A method for providing a mobile phone based treasure hunt game, comprising the steps of:
determining a plurality of geographic sites;
generating puzzle data concerning the plurality of geographic sites, the puzzle data including at least a location of each of the geographic sites, wherein the geographic sites are grouped into one or more groups, each group corresponding to a narrated guided tour;
determining a location of at least one mobile phone;
determining at least one of the geographic sites within a predetermined range of the location of the mobile phone; and
providing at least a portion of the puzzle data concerning the geographic sites within the first predetermined range to the mobile phone;
determining a second location of the at least one mobile phone;
receiving a request to create a new geographic site from the at least one mobile phone;
generating puzzle data pertaining to the new geographic site at the second location of said at least one mobile phone; and
providing puzzle data pertaining to the at least one geographic site to said at least one mobile phone, the provided puzzle data including a narrated portion of one of the narrated guided tours and one or more hints concerning the location of a next geographic site on said one of the narrated guided tours.

17. The method according to claim 16, wherein said step of generating puzzle data includes receiving puzzle data from a user via a mobile phone.

18. The method according to claim 16, wherein said step of determining a location includes receiving location data from the at least one mobile phone.

19. The method according to claim 16, further comprising the steps of:
displaying a question concerning at least one of the geographic sites on a user interface of the mobile phone;
receiving user input indicative of a response to the question.

20. The method according to claim 19, further comprising the step of:
storing points associated with a user of the mobile phone based on the response.

21. The method according to claim 16, further comprising the step of:
providing location data to said at least one mobile phone, the location data indicative of a location of one or more second mobile phones corresponding to other users on the same guided tour.

* * * * *